3,658,715
ANTIMONY-ACTIVATED CALCIUM HALO-
PHOSPHATE CONTAINING BORON
Shannon Jones, South Euclid, Ohio, assignor to
General Electric Company
Filed Jan. 26, 1970, Ser. No. 5,678
Int. Cl. C09k 1/36
U.S. Cl. 252—301.4 P          20 Claims

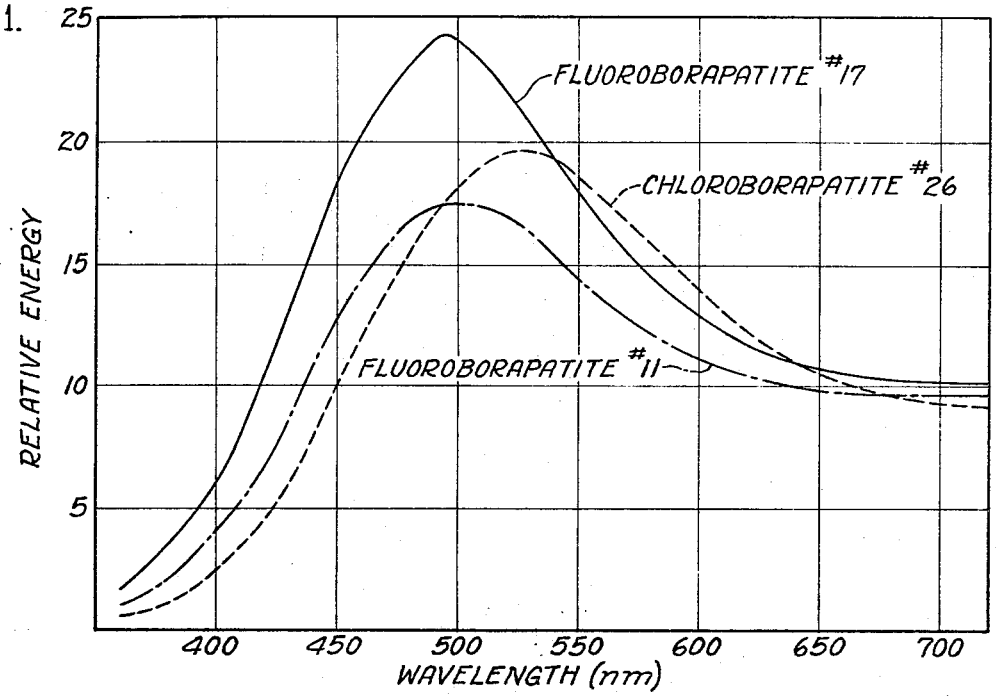
Fig. 1. SPECTRAL DISTRIBUTIONS UNDER 253.7 nm EXCITATION
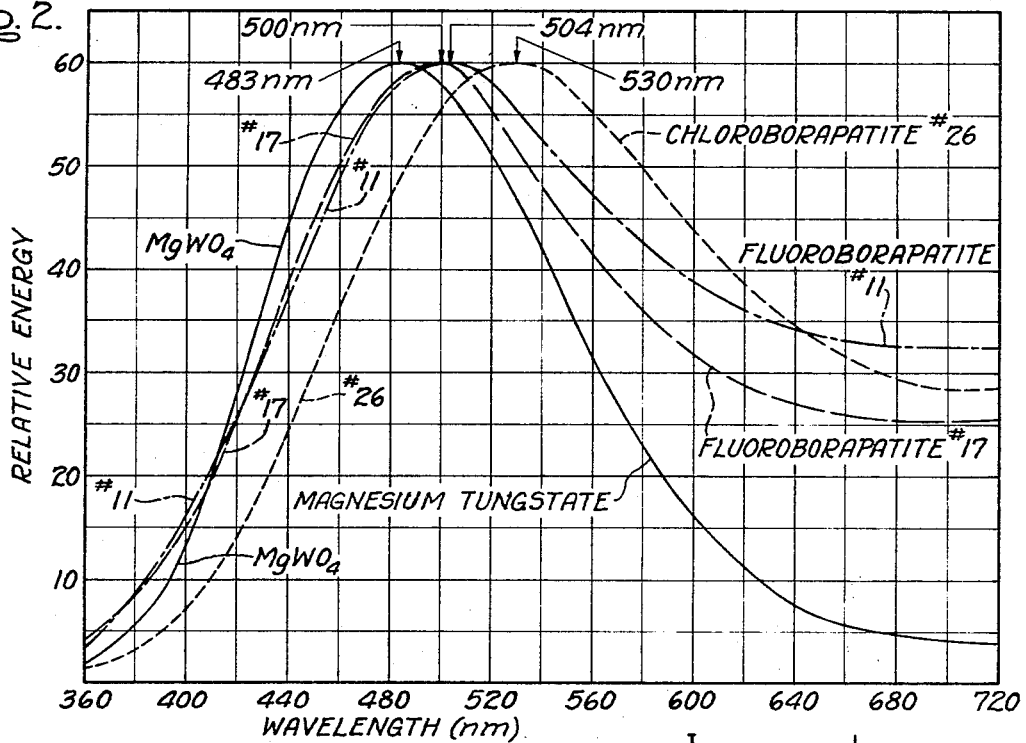
Fig. 2. SPECTRAL DISTRIBUTIONS UNDER 253.7 nm EXCITATION
Inventor:
Shannon Jones
by Richard H. Burgess
His Attorney

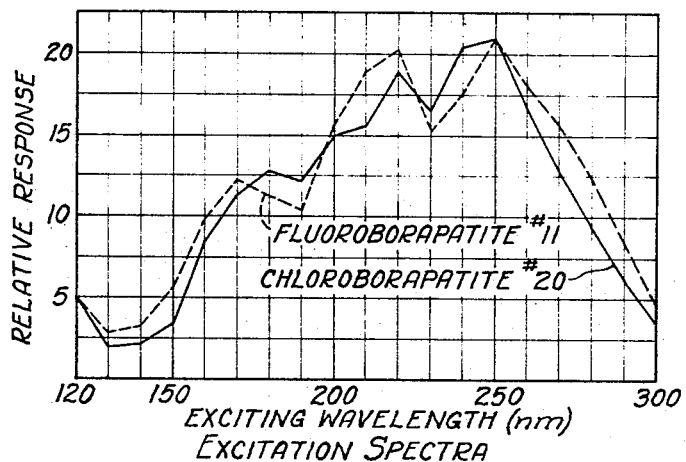
Fig. 3. Excitation Spectra
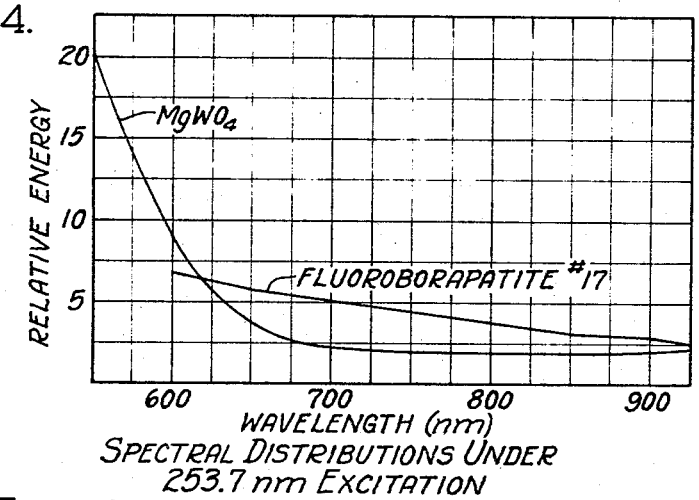
Fig. 4. Spectral Distributions Under 253.7 nm Excitation
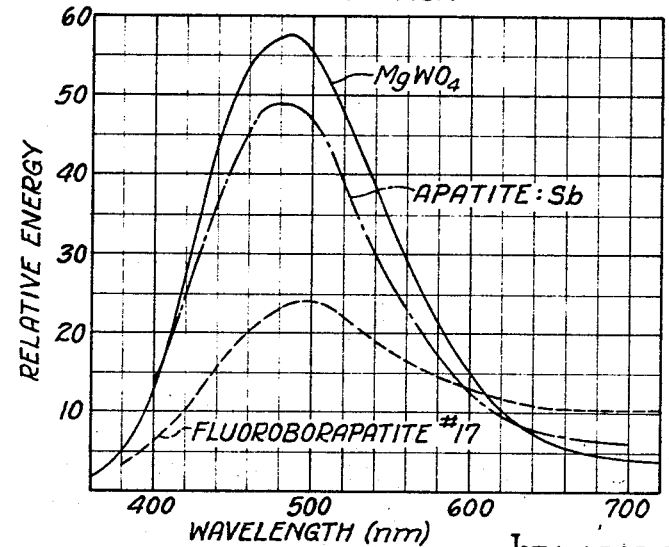
Fig. 5. Spectral Distributions Under 253.7 nm Excitation
Inventor:
Shannon Jones United States Patent Office 3,658,715
Patented Apr. 25, 1972

ABSTRACT OF THE DISCLOSURE

Relates to alkaline earth haloborapatite phosphors activated with antimony and useful in fluorescent lamps and other applications.

BACKGROUND OF THE INVENTION

This invention relates generally to phosphors and more particularly to calcium haloborapatite phosphors having broad spectral emission peaks.

The alkaline earth halophosphate phosphors are well known. These phosphors are useful as luminescent materials when activated. A typical antimony-activated phosphor of this type may be written:

$$3Ca_3(PO_4)_2CaX_2:Sb$$

where X is one or more of the halogens fluorine and chlorine.

In general, the halophosphates are compounds more or less analogous to them ineral aptite, which may be represented by the matrix:

$$3M_3(PO_4)_2 \cdot 1M^1X_2$$

where X represents a halogen or a mixture of halogens and M and $M^1$ represent either different or identical bivalent metals or mixtures of such metals.

The primary metallic constituent for most halo-phosphate phosphors is calcium although strontium can be used to replace part or all of the calcium. The halide constituent prior to firing normally comprises calcium or strontium chlorides or fluorides or mixtures of both and the matrix is normally activated by antimony or antimony plus manganese.

In the present invention the antimony-activated phosphor (1)     $3Ca_3(PO_4)_2 \cdot 0.9CaX_2 \cdot 0.1SbOX$ has been modified, for example, as follows:

(2)     $3Ca_3(PO_4)_2 \cdot 0.9BOX \cdot 0.1SbOX$

X=halogen.

In both Formulas 1 and 2 Sb is trivalent, and the substitution of oxygen for one of the halogens in part of the $CaX_2$ provides charge compensation. When the remainder of the $CaX_2$ is replaced by ROX, where R is trivalent, unusual results were obtained. The trivalent elements tried included B, Al, Y, La, Ga and In. However, of the trivalent elements tried, only boron gave a substantial visual color variation, e.g., changing the color from blue-white to white under ultraviolet (UV) 253.7 nanometer (nm.) excitation. This property of boron was unexpected because of its small ionic size. Furthermore, it was found that CaO in excess of the equivalent in Formula 2, gave brighter white phosphors. Such a formula, e.g., is (3)     $3Ca_3(PO_4)_2 \cdot 0.9BOX \cdot 0.1SbOX \cdot 0.5CaO$ X=halogen.

SUMMARY OF THE INVENTION

It is therefore an object of my invention to provide a luminescent material activated with antimony or antimony plus manganese and containing trivalent boron.

It is a further object of my invention to produce a luminescent material having improved color characteristics including a relatively flat emission distribution with broadband emission.

Briefly stated, the present invention provides an antimony-activated alkaline earth borapatite phosphor made with at least one of chlorine and fluorine as the halogen with boron partially replacing the alkaline earth metal and with oxygen partially replacing the fluorine to the extent that, for each alkaline earth metal atom replaced by boron, one fluorine atom is replaced by oxygen. The composition has essentially the following formula:

$$xMO \cdot 3P_2O_5 \cdot yB_2O_3 \cdot wSbOX \cdot zMX_2$$

wherein M is wholly or predominantly calcium although partial substitution of minor amounts such as up to about 2.5 to 5 atom percent of Sr, Ba or Cd can be tolerated, and X is fluorine or chlorine, and wherein x has a value of from 8.85 to 9.35, y has a value of from 0.25 to 0.55, w has a value of from 0.05 to 0.5, and z has a value of from 0.15 to 0.65. An example of this phosphor expressed in other terminology is:

$$3Ca_3(PO_4)_2 \cdot 0.8BOF \cdot 0.2SbOF \cdot 0.5CaO$$

As stated, some partial substitution for calcium by strontium, barium or cadminum (which is not an alkaline earth metal) does not substantially affect the brightness or color of the calcium fluoroborapatite:Sb. For example, in the formula:

$$3Ca_3(PO_4)_2 \cdot 0.8BOF \cdot 0.2SbOF \cdot 0.25CaO \cdot 0.25RO$$

R may be strontium, barium or cadmium with very little effect on brightness or color.

It should be noted that, while in the borapatite phosphor antimony is the essential activator, its concentration is not critical.

Those parts of the present invention which are considered to be new are set forth in detail in the claims appended hereto. The invention, however, may be better understood and further objects and advantages thereof appreciated from a consideration of the drawings and detailed description.

DRAWINGS AND DETAILED DESCRIPTION

FIG. 1 is a spectral distribution graph with constant 253.7 nm. excitation showing the relatively brightness of specific phosphors.

FIG. 2 is a spectral distribution graph normalized to peak at 60 units, comparing the emission spectra and peaks of specific phosphors. The increased emission of the borapatites in the red (600 to 700 nm.) is evident in this figure.

FIG. 3 is a graph of the excitation spectra of fluoroborapatite and chloroborapatite relative to sodium salicylate.

FIG. 4 shows the emission of a fluoroborapatite in the infrared.

FIG. 5 compares the emission of a fluoroborapatite of the invention with calcium haloapatite activated with antimony, and with $MgWO_4$, both being phosphors of the prior art.

Referring more particularly to FIG. 1, fluoroborapatite compositions 17 and 11 of Test II are compared to chloroborapatite composition 26 under 253.7 nm. excitation. The tests demonstrated that composition 17 of Test II, which had the high $CaF_2$, low $H_3BO_3$ and low $CaCO_3$ was the brightest being 42.9% of NT, (cool-white calcium fluorchlorapatite:Sb, Mn) as further shown in Photometric Data of Table II referred to hereinafter. However, the spread in UV absorption, brightness and color was considerably less over the compositions in Test II than in Test I.

Referring more particularly to FIG. 2, the compositions 17 and 11 of Test II, using magnesium tungstate N.B.S. 1027 (BW) as a standard, are compared for color. The results are cataloged in Photometric Data of Table II referred to hereinafter. The results may be compared with Photometric Data of Test I in Table I as well as Photometric Data of Tables III and IV referred to hereinafter. All the tests were conducted under 254 nm. excitation. The color coordinates $x$ and $y$ are those of the C.I.E. International system, as described by Deane B. Judd in "Color in Business, Science and Industry," pages 99, 101 et seq., Wiley, 1952. The subjective colors depend on the surrounding colors but for all the phosphors they are pastels or off-whites with a broad-band spectral emission. As an example, composition 8 in Photometric Data of Table I was blue-white whereas composition 2 of the same table was a yellow-pink-white composition. Chloroborapatite, number 26, on the other hand, was yellow-white or yellow-green-white. All the phosphors referred to are useful because of their flat distribution of light output.

Referring to FIG. 3, there is shown a graph depicting a composition of fluoroborapatite number 11 and chloroborapatite number 20 relative to sodium salicylate as a standard, when excited by different wavelengths.

Further, FIG. 4 shows the emission of the fluoroborapatite composition, number 17 of Test II hereinafter, $$8.98CaO \cdot 3P_2O_5 \cdot 0.25B_2O_3 \cdot 0.2SbOF \cdot 0.54CaF_2$$

into the infrared region (700 to 900 nm.), and

FIG. 5 shows the fluoroborapatite composition number 17 of Test II vs. regular fluorapatite:Sb (BT—blue-white calcium fluorapatite:Sb), as well as magnesium tungstate. The increased red emission (600 to 700 nm.) due to boron is evident.

A preferred embodiment for brightness comprises the composition:

$$8.85CaO \cdot 3P_2O_5 \cdot 0.3B_2O_3 \cdot 0.2SbOF \cdot 0.65CaF_2$$

However, the composition:

$$9.10CaO \cdot 3P_2O_5 \cdot 0.4B_2O_3 \cdot 0.2SbOF \cdot 0.40CaF_2$$

has a better color for some uses in that it is less blue.

In preparing the compositions of this invention, the temperatures are not critical and the phosphors may be fired over a range from about 1120° C. to 1200° C. with little brightness change. The center composition number 2, referred to below, has been fired as high as 1246° C. with only a slight loss in brightness and slight color shift but when fired at 1295° C., a new phase, a more saturated yellow under 253.7 nm. excitation appeared. For the chloroborapatites 1140° C. is a good temperature, 1120° C. to 1160° C. a reasonable limited range while greater deviations, <1100° C. or >1200° C. will begin to cause brightness loss.

Specific examples of the procedure used in the preparation of the phosphor compositions of this invention are given below. First the examples for Test I.

EXAMPLE I

| Relative mols: | Grams |
|---|---|
| 6.00—$CaHPO_4$ | 828 |
| 2.75—$CaCO_3$ | 275 |
| 0.60—$H_3BO_3$ | 37 |
| 0.10—$Sb_2O_3$ | 29 |
| 0.25—$CaF_2$ | 20 |

The above ingredients were mixed and about 25 grams were fired in an uncovered quartz crucible at a temperature of about 1150° C. for about 40 to 50 minutes. An increased time of firing had virtually no effect on brightness or color. The temperature may range from 1050° C. to 1200° C. However, the preferred range is from 1150° C. to 1160° C. This phosphor has essentially the following composition, assuming no loss of Sb, F or B:

$$8.85CaO \cdot 3P_2O_5 \cdot 0.3B_2O_3 \cdot 0.2SbOF \cdot 0.15CaF_2.$$

EXAMPLE 2

| Relative mols: | Grams |
|---|---|
| 6.00—$CaHPO_4$ | 828 |
| 3.00—$CaCO_3$ | 300 |
| 0.80—$H_3BO_3$ | 50 |
| 0.10—$Sb_2O_3$ | 29 |
| 0.50—$CaF_2$ | 39 |

The above ingredients were mixed and fired in the same manner as in Example 1 and had the following composition, assuming no loss of Sb, F or B:

$$9.10CaO \cdot 3P_2O_5 \cdot 0.4B_2O_3 \cdot 0.2SbOF \cdot 0.40CaF_2$$

EXAMPLE 3

| Relative mols: | Grams |
|---|---|
| 6.00—$CaHPO_4$ | 828 |
| 3.25—$CaCO_3$ | 325 |
| 1.00—$H_3BO_3$ | 62 |
| 0.10—$Sb_2O_3$ | 29 |
| 0.75—$CaF_2$ | 59 |

The above ingredients were mixed and fired in the same manner as in Example 1 and had the following composition, assuming no loss of Sb, F or B:

$$9.35CaO \cdot 3P_2O_5 \cdot 0.5B_2O_3 \cdot 0.2SbOF \cdot 0.65CaF_2$$

EXAMPLE 4

| Relative mols: | Grams |
|---|---|
| 6.00—$CaHPO_4$ | 828 |
| 3.25—$CaCO_3$ | 325 |
| 0.60—$H_3BO_3$ | 37 |
| 0.10—$Sb_2O_3$ | 29 |
| 0.75—$CaF_2$ | 59 |

The above ingredients were mixed and fired in the same manner as in Example 1 and had the following composition, assuming no loss of Sb, F or B:

$$9.35CaO \cdot 3P_5O_2 \cdot 0.3B_2O_3 \cdot 0.2SbOF \cdot 0.65CaF_2$$

EXAMPLE 5

| Relative mols: | Grams |
|---|---|
| 6.00—$CaHPO_4$ | 828 |
| 3.25—$CaCO_3$ | 325 |
| 1.00—$H_3BO_3$ | 62 |
| 0.10—$Sb_2O_3$ | 29 |
| 0.25—$CaF_2$ | 20 |

The above ingredients were mixed and fired in the same manner as in Example 1 and had the following composition, assuming no loss of Sb, F or B:

$$9.35CaO \cdot 3P_2O_5 \cdot 0.5B_2O_3 \cdot 0.2SbOF \cdot 0.15CaF_2$$

EXAMPLE 6

| Relative mols: | Grams |
|---|---|
| 6.00—$CaHPO_4$ | 828 |
| 3.25—$CaCO_3$ | 325 |
| 0.60—$H_3BO_3$ | 37 |
| 0.10—$Sb_2O_3$ | 29 |
| 0.25—$CaF_2$ | 20 |

The above ingredients were mixed and fired in the same manner as in Example 1 and had the following composition, assuming no loss of Sb, F or B:

$$9.35CaO \cdot 3P_2O_5 \cdot 0.3B_2O_3 \cdot 0.2SbOF \cdot 0.15CaF_2$$

EXAMPLE 7

| Relative mols: | Grams |
|---|---|
| 6.00—$CaHPO_4$ | 828 |
| 2.75—$CaCO_3$ | 275 |
| 1.00—$H_3BO_3$ | 62 |
| 0.10—$Sb_2O_3$ | 29 |
| 0.75—$CaF_2$ | 59 |

The above ingredients were mixed and fired in the same manner as in Example 1 and had the following composition, assuming no loss of Sb, F or B:

$$8.85CaO \cdot 3P_2O_5 \cdot 0.5B_2O_3 \cdot 0.2SbOF \cdot CaF_2$$

EXAMPLE 8

Relative mols: Grams
- 6.00—$CaHPO_4$ _____ 828
- 2.75—$CaCO_3$ _____ 275
- 0.60—$H_3BO_3$ _____ 37
- 0.10—$Sb_2O_3$ _____ 29
- 0.75—$CaF_2$ _____ 59

The above ingredients were mixed and fired in the same manner as in Example 1 and had the following composition, assuming no loss of Sb, F or B:

$$8.85CaO \cdot 3P_2O_5 \cdot 0.3B_2O_3 \cdot 0.2SbOF \cdot 0.65CaF_2$$

EXAMPLE 9

Relative mols: Grams
- 6.00—$CaHPO_4$ _____ 828
- 2.75—$CaCO_3$ _____ 275
- 1.00—$H_3BO_3$ _____ 62
- 0.10—$Sb_2O_3$ _____ 29
- 0.25—$CaF_2$ _____ 20

The above ingredients were mixed and fired in the same manner as in Example 1 and had the following composition, assuming no loss of Sb, F or B:

$$8.85CaO \cdot 3P_2O_5 \cdot 0.5B_2O_3 \cdot 0.2SbOF \cdot 0.15CaF_2$$

Of the compositions prepared above, Example 8 was visually the brightest under 254 nm. excitation. Compared with Example 2, Example 8, was blue-white where Example 2 was yellow-pink-white. Relative luminance and percentage ultraviolet absorption readings as well as color measurements in the C.I.E. system and color impressions are as follows:

TABLE I
Photometric Data for Test I

| Example No. | UV absorption | Luminance | Color x | Color y | Color impression |
|---|---|---|---|---|---|
| 1 | 88.5 | 22.6 | .275 | .294 | Muddy pink-brown. |
| 2 (center) | 93.6 | 32.5 | .271 | .298 | Pinkish, yellowish white. |
| 3 | 80.5 | 22.2 | .242 | .276 | Bluish white. |
| 4 | 82.0 | 25.7 | .240 | .275 | Do. |
| 5 | 90.0 | 23.7 | .284 | .321 | Slightly greenish yellow-white. |
| 6 | 87.6 | 24.2 | .284 | .320 | Do. |
| 7 | 94.6 | 42.0 | .241 | .270 | Blue-white. |
| 8 | 94.9 | 45.0 | .239 | .269 | Do. |
| 9 | 88.3 | 19.4 | .279 | .293 | Muddy pink-brown. |
| NT [1] | 93 | 100.0 | .375 | .360 | Cool-white. |
| BT [2] | 93 | 60.5 | .191 | .224 | Blue-white. |

[1] Standard cool-white Ca fluorchlorapatite: Sb, Mn.
[2] Standard calcium fluoropatite: Sb.

The second two-level, three-factor test was run, as discussed below for Test II, around the same center composition as No. 2 in Test I. Here the range was greater for $H_3BO_3$ and smaller for $CaCO_3$ and $CaF_2$. In this second test the $CaCO_3$ ranged from 2.88 to 3.12, the $CaF_2$ from 0.36 to 0.64, the $H_3BO_3$ from 0.50 to 1.10.

Again it was No. 17 in Test II which had the high $CaF_2$, low $H_3BO_3$ and low $CaCO_3$ composition, that was the brightest, being 42.9% of NT.

The spread in UV absorption, brightness and color was considerably less over the nine compositions in Test II than in Test I.

The following procedures were used in the preparation of the phosphors of Test II:

EXAMPLE 10

Relative mols: Grams
- 6.00—$CaHPO_4$ _____ 828
- 2.88—$CaCO_3$ _____ 288
- 0.50—$H_3BO_3$ _____ 61
- 0.10—$Sb_2O_3$ _____ 29
- 0.36—$CaF_2$ _____ 28

The above ingredients were mixed and fired in the same manner as in Example 1 of Test I and had the following composition, assuming no loss of Sb, F or B:

$$8.98CaO \cdot 3P_2O_5 \cdot 0.25B_2O_3 \cdot 0.2SbOF \cdot 0.26CaF_2$$

EXAMPLE 11

Relative mols: Grams
- 6.00—$CaHPO_4$ _____ 828
- 3.00—$CaCO_3$ _____ 300
- 0.80—$H_3BO_3$ _____ 50
- 0.10—$Sb_2O_3$ _____ 29
- 0.50—$CaF_2$ _____ 39

The above ingredients were mixed and fired in the same manner as in Example 1 of Test I and had the following composition, assuming no loss of Sb, F or B:

$$9.10CaO \cdot 3P_2O_5 \cdot 0.4B_2O_3 \cdot 0.2SbOF \cdot 0.40CaF_2$$

Although this is nominally the same composition as that of Example 2 in Test I, it was prepared differently and had slightly different properties, as indicated below.

EXAMPLE 12

Relative mols: Grams
- 6.00—$CaHPO_4$ _____ 828
- 3.12—$CaCO_3$ _____ 312
- 1.10—$H_3BO_3$ _____ 68
- 0.10—$Sb_2O_3$ _____ 29
- 0.64—$CaF_2$ _____ 50

The above ingredients were mixed and fired in the same manner as in Example 1 of Test I and had the following composition, assuming no loss of Sb, F or B:

$$9.22CaO \cdot 3P_2O_5 \cdot 0.55B_2O_3 \cdot 0.2SbOF \cdot 0.54CaF_2$$

EXAMPLE 13

Relative mols: Grams
- 6.00—$CaHPO_4$ _____ 828
- 3.12—$CaCO_3$ _____ 312
- 0.50—$H_3BO_3$ _____ 31
- 0.10—$Sb_2O_3$ _____ 29
- 0.64—$CaF_2$ _____ 50

The above ingredients were mixed and fired in the same manner as in Example 1 of Test I and had the following composition, assuming no loss of Sb, F or B:

$$9.22CaO \cdot 3P_2O_5 \cdot 0.25B_2O_3 \cdot 0.2SbOF \cdot 0.54CaF_2$$

EXAMPLE 14

Relative mols: Grams
- 6.00—$CaHPO_4$ _____ 828
- 3.12—$CaCO_3$ _____ 312
- 1.10—$H_3BO_3$ _____ 68
- 0.10—$Sb_2O_3$ _____ 29
- 0.36—$CaF_2$ _____ 28

The above ingredients were mixed and fired in the same manner as in Example 1 of Test I and had the following composition, assuming no loss of Sb, F or B:

$$9.22CaO \cdot 3P_2O_5 \cdot 0.55B_2O_3 \cdot 0.2SbOF \cdot 0.26CaF_2$$

EXAMPLE 15

Relative mols: Grams
- 6.00—$CaHPO_4$ _____ 828
- 3.12—$CaCO_3$ _____ 312
- 0.50—$H_3BO_3$ _____ 31
- 0.10—$Sb_2O_3$ _____ 29
- 0.36—$CaF_2$ _____ 28

The above ingredients were mixed and fired in the same manner as in Example 1 of Test I and had the following composition, assuming no loss of Sb, F or B:

$$9.22CaO \cdot 3P_2O_5 \cdot 0.25B_2O_3 \cdot 0.2SbOF \cdot 0.26CaF_2$$

EXAMPLE 16

Relative mols: Grams
- 6.00—$CaHPO_4$ _____ 828
- 2.88—$CaCO_3$ _____ 288
- 1.10—$H_3BO_3$ _____ 68
- 0.10—$Sb_2O_3$ _____ 29
- 0.64—$CaF_2$ _____ 50

The above ingredients were mixed and fired in the same manner as in Example 1 of Test I and had the following composition, assuming no loss of Sb, F or B:

$$8.98CaO \cdot 3P_2O_5 \cdot 0.55B_2O_3 \cdot 0.2SbOF \cdot 0.54CaF_2$$

EXAMPLE 17

Relative mols: | Grams
---|---
6.00—CaHPO₄ | 828
2.88—CaCO₃ | 288
0.50—H₃BO₃ | 31
0.10—Sb₂O₃ | 29
0.64—CaF₂ | 50

The above ingredients were mixed and fired in the same manner as in Example 1 of Test I and had the following composition, assuming no loss of Sb, F or B:

$8.98CaO \cdot 3P_2O_5 \cdot 0.25B_2O_3 \cdot 0.2SbOF \cdot 0.54CaF_2$

EXAMPLE 18

Relative mols: | Grams
---|---
6.00—CaHPO₄ | 828
2.88—CaCO₃ | 288
1.10—H₃BO₃ | 68
0.10—Sb₂O₃ | 29
0.36—CaF₂ | 28

The above ingredients were mixed and fired in the same manner as in Example 1 of Test I and had the following composition, assuming no loss of Sb, F or B:

$8.98CaO \cdot 3P_2O_5 \cdot 0.55B_2O_3 \cdot 0.2SbOF \cdot 0.26CaF_2$

TABLE II
Photometric Data—Comparison of Tests I and II

| Example No. | UV absorption | Luminance | Color x | Color y |
|---|---|---|---|---|
| 17 | 94.9 | 42.9 | .250 | .278 |
| 8S | 94.9 | 45.0 | .239 | .269 |
| 11 | 94.0 | 34.3 | .268 | .293 |
| 2 | 93.6 | 32.5 | .271 | .298 |

It has been found that the Sb content is relatively non-critical. This tolerance is demonstrated by a test in which the total R₂O₃ was kept constant (including B₂O₃ from H₃BO₃) in a formula similar to Example 2 in Test I and Example 11 in Test II. The only variation was in the Sb₂O₃:B₂O₃ ratio as follows:

| | Relative mols | |
|---|---|---|
| | Low Sb No. 11A | High Sb No. 11B |
| CaHPO₄ | 6 | 6 |
| CaCO₃ | 3 | 3 |
| H₃BO₃B₂O₃ | 0.950 (0.475) | 0.50 (0.25) |
| Sb₂O₃ | 0.025 | 0.25 |
| CaF₂ | 0.5 | 0.5 |

These batches were fired at 1150° C.; the photometric data follows:

TABLE III
Photometric Data—Sb Variations

| Sample | UV absorption percent | Luminance | Color x | Color y |
|---|---|---|---|---|
| 11A | 85.0 | 33.5 | .271 | .293 |
| 11B | 94.9 | 34.6 | .260 | .293 |
| 11 | 94.0 | 34.3 | .268 | .293 |

From the above data we see that No. 11 of Test II, which has an Sb:B atomic ratio of 1:4, has virtually the same UV absorption and brightness as No. 11B, which has an Sb:B atomic ratio of 1:1.

CHLOROBORAPATITES

In formulating the chloroborapatite phosphors, instead of substituting CaCl₂ for CaF₂, CaCO₃+NH₄Cl is used. With NH₄Cl it is desirable to use an excess to allow for volatilization. This excess is not critical.

EXAMPLE 19

Relative mols: | Grams
---|---
6.00—CaHPO₄ | 828
2.88—CaCO₃ | 288
0.50—H₃BO₃ | 31
0.10—Sb₂O₃ | 29
0.36—CaCl₂ | ¹36

¹ CaCO₃+58 NH₄Cl.

The above ingredients were mixed and fired in a crucible at a temperature of about 1140° C. This phosphor has essentially the following composition, assuming no loss of Sb, Cl or B:

$8.98CaO \cdot 3P_2O_5 \cdot 0.25B_2O_3 \cdot 0.2SbOCl \cdot 0.26CaCl_2$

EXAMPLE 20

Relative mols: | Grams
---|---
6.00—CaHPO₄ | 828
3.00—CaCO₃ | 288
0.80—H₃BO₃ | 50
0.10—Sb₂O₃ | 29
0.50—CaCl₂ | ¹50

¹ CaCO₃+81 NH₄Cl.

The above ingredients were mixed and fired in the same manner as in Example 19 and had the following composition, assuming no loss of Sb, Cl or B:

$9.10CaO \cdot 3P_2O_5 \cdot 0.40B_2O_3 \cdot 0.2SbOCl \cdot 0.40CaCl_2$

EXAMPLE 21

Relative mols: | Grams
---|---
6.00—CaHPO₄ | 828
3.12—CaCO₃ | 312
1.10—H₃BO₃ | 68
0.10—Sb₂O₃ | 29
0.64—CaCl₂ | ¹64

¹ CaCO₃+104 NH₄Cl.

The above ingredients were mixed and fired in the same manner as in Example 19 and had the following composition, assuming no loss of Sb, Cl or B:

$9.22CaO \cdot 3P_2O_5 \cdot 0.55B_2O_3 \cdot 0.2SbOCl \cdot 0.54CaCl_2$

EXAMPLE 22

Relative mols: | Grams
---|---
6.00—CaHPO₄ | 828
3.12—CaCO₃ | 312
0.50—H₃BO₃ | 31
0.10—Sb₂O₃ | 29
0.64—CaCl₂ | ¹64

¹ CaCO₃+104 NH₄Cl.

The above ingredients were mixed and fired in the same manner as in Example 19 and had the following composition, assuming no loss of Sb, Cl or B:

$9.22CaO \cdot 3P_2O_5 \cdot 0.25B_2O_3 \cdot 0.2SbOCl \cdot 0.54CaCl_2$

EXAMPLE 23

Relative mols: | Grams
---|---
6.00—CaHPO₄ | 828
3.12—CaCO₃ | 312
1.10—H₃BO₃ | 68
0.10—Sb₂O₃ | 29
0.36—CaCl₂ | ¹36

¹ CaSO₃+58 NH₄Cl.

The above ingredients were mixed and fired in the same manner as in Example 19 and had the following composition, assuming no loss of Sb, Cl or B:

$9.22CaO \cdot 3P_2O_5 \cdot 0.55B_2O_3 \cdot 0.2SbOCl \cdot 0.26CaCl_2$

EXAMPLE 24

Relative mols: | Grams
---|---
6.00—CaHPO₄ | 828
3.12—CaCO₃ | 312
0.50—H₃BO₃ | 31
0.10—Sb₂O₃ | 29
0.36—CaCl₂ | ¹36

¹ CaCO₃+104 NH₄Cl.

The above ingredients were mixed and fired in the same manner as in Example 19 and had the following composition, assuming no loss of Sb, Cl or B:

$9.22CaO \cdot 3P_2O_5 \cdot 0.25B_2O_3 \cdot 0.2SbOCl \cdot 0.26CaCl_2$

EXAMPLE 25

Relative mols: Grams
- 6.00—CaHPO$_4$ ———————————————— 828
- 2.88—CaCO$_3$ ————————————————— 288
- 1.10—H$_3$BO$_3$ ——————————————— 68
- 0.10—Sb$_2$O$_3$ ——————————————— 29
- 0.64—CaCl$_2$ ———————————————— $^1$64

$^1$ CaCO$_3$+104 NH$_4$Cl.

The above ingredients were mixed and fired in the same manner as in Example 19 and had the following composition, assuming no loss of Sb, Cl or B:

8.98CaO·3P$_2$O$_5$·0.55B$_2$O$_3$·0.2SbOCl·0.54CaCl$_2$

EXAMPLE 26

Relative mols: Grams
- 6.00—CaHPO$_4$ ———————————————— 828
- 2.88—CaCO$_3$ ————————————————— 288
- 0.50—H$_3$BO$_3$ ——————————————— 31
- 0.10—Sb$_2$O$_3$ ——————————————— 29
- 0.64—CaCl$_2$ ———————————————— $^1$64

$^1$ CaCO$_3$+104 NH$_4$Cl.

The above ingredients were mixed and fired in the same manner as in Example 19 and had the following composition, assuming no loss of Sb, Cl or B:

8.98CaO·3P$_2$O$_5$·0.25B$_2$O$_3$·0.2SbOCl·0.54CaCl$_2$

EXAMPLE 27

Relative mols: Grams
- 6.00—CaHPO$_4$ ———————————————— 828
- 2.88—CaCO$_3$ ————————————————— 288
- 1.10—H$_3$BO$_3$ ——————————————— 68
- 0.10—Sb$_2$O$_3$ ——————————————— 29
- 0.36—CaCl$_2$ ———————————————— $^1$36

$^1$ CaCO$_3$+58 NH$_4$Cl.

The above ingredients were mixed and fired in the same manner as in Example 19 and had the following composition, assuming no loss of Sb, Cl or B:

8.98CaO·3P$_2$O$_5$·0.55B$_2$O$_3$·0.2SbOCl·0.26CaCl$_2$

TABLE IV

| Example No. | Photometric Data—Chloroborapatites | | | | |
|---|---|---|---|---|---|
| | UV absorption | Luminance | Color x | Color y | Color impression |
| 19 | 91.4 | 38.9 | .301 | .341 | Yellowish white. |
| 20 | 89.8 | 41.9 | .300 | .342 | Yellow-green-white. |
| 21 | 82.7 | 27.0 | .281 | .325 | Dull blue-gray. |
| 22 | 81.7 | 26.4 | .275 | .320 | Do. |
| 23 | 89.1 | 36.9 | .304 | .343 | Duller and slightly redder than No. 20. |
| 24 | 89.6 | 40.1 | .301 | .343 | Pinker and duller than No. 20. |
| 25 | 87.7 | 41.4 | .299 | .341 | About same as No. 19. |
| 26 | 87.8 | 43.2 | .296 | .337 | About same as No. 20. |
| 27 | 88.5 | 36.7 | .306 | .341 | Duller and redder than No. 19. |

As many widely different embodiments of this invention may be made without departing from the spirit and scope thereof, it is to be understood that this invention is not limited to the specific embodiments except as defined in the appended claims.

What is claimed as new and desired to be secured by Letters Patent of the United States is:

1. A luminescent material consisting essentially of an alkaline earth halogenated borapatite activated with antimony wherein the alkaline earth is predominately calcium.

2. A luminescent material according to claim 1 wherein minor amounts of an element selected from the group consisting of strontium, barium and cadmium are partially substituted for calcium in the alkaline earth halogenated borapatite.

3. A luminescent material according to claim 1 having the formula:

$x$MO·3P$_2$O$_5$·$y$B$_2$O$_3$·$w$SbOX·$z$MX$_2$ wherein $w$=0.05 to 0.5
$x$=8.85 to 9.35
$y$=0.25 to 0.55
$z$=0.15 to 0.65

M is the alkaline earth metal and X is a halogen.

4. A luminescent material according to claim 3 wherein X is selected from the group consisting of fluorine and chlorine.

5. A luminescent material according to claim 3 having the following formula:

$x$CaO·3P$_2$O$_5$·$y$B$_2$O$_3$·0.2SbOF·$z$CaF$_2$ wherein $x$=8.85 to 9.35
$y$=0.25 to 0.55
$z$=0.15 to 0.65

6. A luminescent material according to claim 5 having essentially the composition:

9.10CaO·3P$_2$O$_5$·0.4B$_2$O$_3$·0.2SbOF·0.40CaF$_2$

7. A luminescent material according to claim 5 having essentially the composition:

8.85CaO·3P$_2$O$_5$·5B$_2$O$_3$·0.2SbOF·0.65CaF$_2$

8. A luminescent material according to claim 5 having essentially the composition:

8.85CaO·3P$_2$O$_5$·0.3B$_2$O$_3$·0.2SbOF·0.65CaF$_2$

9. A luminescent material according to claim 5 having essentially the composition:

8.98CaO·3P$_2$O$_5$·0.25B$_2$O$_3$·0.2SbOF·0.54CaF$_2$

10. A luminescent material according to claim 5 having essentially the composition:

9.22CaO·3P$_2$O$_5$·0.55B$_2$O$_3$·0.2SbOF·0.54CaF$_2$

11. A luminescent material according to claim 5 having essentially the composition:

8.85CaO·3P$_2$O$_5$·0.3B$_2$O$_3$·0.2SbOF·0.15CaF$_2$

12. A luminescent material according to claim 5 having essentially the composition:

9.35CaO·3P$_2$O$_5$·0.5B$_2$O$_3$·0.2SbOF·0.15CaF$_2$

13. A luminescent material according to claim 5 having essentially the composition:

9.35CaO·3P$_2$O$_5$·0.3B$_2$O$_3$·0.2SbOF·0.15CaF$_2$

14. A luminescent material according to claim 3 having the formula:

$x$CaO·3P$_2$O$_5$·$y$B$_2$O$_3$·0.2SbOCl·$z$CaCl$_2$ wherein $x$=8.92 to 9.22
$y$=0.25 to 0.55
$z$=0.26 to 0.54

15. A luminescent material according to claim 14 having essentially the composition:

8.92CaO·3P$_2$O$_5$·0.45B$_2$O$_3$·0.2SbOCl·0.5CaCl$_2$

16. A luminescent material according to claim 14 having essentially the composition:

8.98CaO·3P$_2$O$_5$·0.25B$_2$O$_3$·0.2SbOCl·0.26CaCl$_2$

17. A luminescent material according to claim 14 having essentially the composition:

9.10CaO·3P$_2$O$_5$·0.40B$_2$O$_3$·0.2SbOCl·0.40CaCl$_2$

18. A luminescent material according to claim 14 having essentially the composition:

8.98CaO·3P$_2$O$_5$·0.55B$_2$O$_3$·0.2SbOCl·0.54CaCl$_2$

19. A luminescent material according to claim 14 having essentially the composition:

$8.98CaO \cdot 3P_2O_5 \cdot 0.25B_2O_3 \cdot 0.2SbOCl \cdot 0.54CaCl_2$

20. A luminescent material according to claim 14 having essentially the composition:

$8.98CaO \cdot 3P_2O_5 \cdot 0.55B_2O_3 \cdot 0.2SbOCl \cdot 0.26CaCl_2$

References Cited

UNITED STATES PATENTS

| | | | |
|---|---|---|---|
| 2,488,733 | 11/1949 | McKeag et al. | 252—301.4 P |
| 3,143,510 | 8/1964 | Wanmaker et al. | 252—301.4 P |

ROBERT D. EDMONDS, Primary Examiner